April 28, 1942.  A. E. SCHUH  2,280,981

FABRICATION OF LAMINATED METAL OBJECTS

Filed Oct. 17, 1939

INVENTOR
A. E. SCHUH
BY
*B. H. Jackson*
ATTORNEY

Patented Apr. 28, 1942

2,280,981

UNITED STATES PATENT OFFICE 2,280,981

FABRICATION OF LAMINATED METAL OBJECTS

Arthur E. Schuh, Riverton, N. J., assignor to Bell Telephone Laboratories, Incorporated, New York, N. Y., a corporation of New York Application October 17, 1939, Serial No. 299,816

13 Claims. (Cl. 29—189)

The present invention relates to a laminated metal stock from which laminated metal objects may be machined, to laminated metal objects so formed, to methods of forming said laminated metal stock, and to methods of forming laminated metal objects from said stock.

An object of the present invention is a laminated metal stock, the laminae of which have such a firm adherence to one another that the stock may be machined into various objects of laminate structure.

A further object is a method by which metal sheets may be joined together with a sufficiently firm adherence to form a laminated metal stock capable of being machined.

In the manufacture of magnetic elements for electrical devices, it is often advantageous to employ a laminated metal structure. This is ordinarily accomplished by cutting individual metal sheets to the proper shape and then riveting the pieces together. However, with such a procedure it is possible to form only objects of relatively simple shape, which are built up by riveting together flat plates of substantially the same shape. Moreover, in small pieces of apparatus such as small relays, the magnetic elements are so small in size that it would be impossible to employ rivets in their manufacture.

According to the present invention means is provided whereby laminated metal objects may be formed without riveting. A laminated stock is prepared by coating a number of metal sheets with a thin layer of a thermoplastic adhesive, allowing the adhesive to dry or harden, piling the sheets one on top of the other and subjecting the pile to a high pressure at a temperature above the softening point of the adhesive. During this pressing operation the greater part of the adhesive is forced out from between the sheets. Best results occur when a minimum of adhesive remains, as shown by the fact that the metal stock so prepared will withstand machining in a remarkable manner. It may be turned on a lathe, sawed, milled, threaded or subjected to similar mechanical abuse without the destruction of the bond between the sheets. These machining operations may be carried out without the use of a jig in the same manner as with a solid piece of metal.

It is difficult to determine the thicknes of the adhesive layer which remains between the laminae since only a very small amount of adhesive remains after the pressing operation. The average thickness appears to be of the order of 0.1 mil or less. The thinness of the film may be illustrated by the fact that the finished stock is a good conductor of electricity from plate to plate across the adhesive film. It is not certain whether this conductivity is due to the overall thinness of the film or to the fact that the irregularities in the surfaces of the plates cause the film to approach a monomolecular layer or to disappear entirely at certain points so that there is metal to metal contact. In spite of the overall conductivity of the stock, the adhesive film possesses sufficient resistance, at least locally at the majority of the points of the layer, to impart desirable magnetic properties to the laminated material.

The use of the laminated stock of the present invention makes possible the formation of smaller and more detailed laminated parts than is feasible by the riveting procedure. The manner in which parts may be machined from the laminated stock is illustrated in the drawing in which.

Figure 1:
Fig. 1 represents a block of the laminated stock of the present invention.
Figure 2:
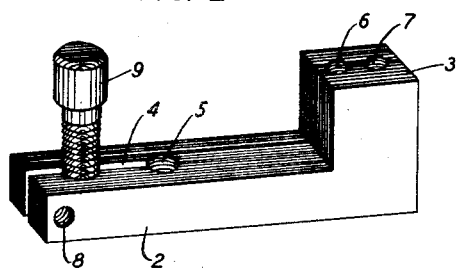
Fig. 2 represents a relay pole-piece machined from stock of this type.

Referring to Fig. 1 it may be seen that the laminated stock consists of a pile of rectangular pieces 1 firmly bonded together. In Fig. 2 the body 2 of the relay pole-piece is machined from a laminated block made up of a pile of sheets 3 securely bonded together. A slot 4 has been machined in one arm of the pole-piece along the direction of the laminae. Holes 5, 6 and 7 have been drilled along the direction of the laminae. Hole 8 has been drilled across the laminae. Holes 6, 7 and 8 have each been internally threaded. Screw 9 has been turned from a similar laminated block and has been externally threaded.

In small electrical relays the use of pole-pieces as shown in Fig. 2 and also the use of armatures, cores and yokes of similar laminated structure has been found to improve appreciably the speed of operation of the relays over relays in which a solid metal structure is employed Prior to the present invention it has not been feasible to manufacture these small and detailed parts with a laminated structure. Each of these parts may be machined from the laminated stock of the present invention.

In the manufacture of the laminated stock any suitable natural or synthetic thermoplastic adhesive may be employed, particularly the thermoplastic linear resins. Resins of the vinyl, acrylate and methacrylate types have been found

laminated body in which a pile of metal laminae are bonded face to face by an adhesive selected from the group consisting of the acrylate and methacrylate ester resins, said bond being of sufficient strength to permit the body to be milled, threaded and turned in a lathe in a manner similar to a solid body of metal.

12. The device described in claim 5 wherein the vinyl resin is selected from the group consisting of polyvinyl acetate and polyvinyl acetal.

13. In an electrical device, a machined magnetic member comprising a laminated body of magnetic metal sheets which are bonded face to face by an adhesive selected from the group consisting of the acrylate and methacrylate ester resins, said bond being of sufficient strength to permit the body to be milled, threaded and turned in a lathe in a manner similar to a solid body of metal.

ARTHUR E. SCHUH.

DISCLAIMER 2,280,981.—*Arthur E. Schuh*, Riverton, N. J. FABRICATION OF LAMINATED METAL OBJECTS. Patent dated Apr. 28, 1942. Disclaimer filed Oct. 30, 1945, by the assignee, *Bell Telephone Laboratories, Incorporated.*

Hereby enters this disclaimer to claims 1, 2, 4, 5, 10, and 12 of said patent.

[*Official Gazette December 11, 1945*]